United States Patent
Kerlin

(10) Patent No.: US 7,459,823 B1
(45) Date of Patent: Dec. 2, 2008

(54) RESONANT UNIPOLAR GENERATOR

(75) Inventor: Jack H. Kerlin, Provo, UT (US)

(73) Assignee: RT Patent Company, Inc., Wilmington, DE (US)

( * ) Notice: Subject to any disclaimer, the term of this patent is extended or adjusted under 35 U.S.C. 154(b) by 429 days.

(21) Appl. No.: 11/404,068

(22) Filed: Apr. 13, 2006

Related U.S. Application Data

(60) Provisional application No. 60/671,890, filed on Apr. 14, 2005.

(51) Int. Cl.
*H02K 31/00* (2006.01)

(52) U.S. Cl. ...................................................... 310/178

(58) Field of Classification Search ................. 310/178, 310/219, 232, 114, 115, 168; 474/84
See application file for complete search history.

(56) References Cited

U.S. PATENT DOCUMENTS

| | | | | |
|---|---|---|---|---|
| 3,586,894 | A | * | 6/1971 | Mueller ....................... 310/168 |
| 3,743,874 | A | * | 7/1973 | Chabrerie et al. ........... 310/178 |
| 3,751,710 | A | * | 8/1973 | Carmichael et al. .......... 315/79 |
| 3,896,320 | A | * | 7/1975 | Moffatt ........................ 310/64 |
| 4,086,506 | A | * | 4/1978 | Kustom et al. ................ 310/74 |
| 4,585,085 | A | * | 4/1986 | Handel et al. ............... 180/65.2 |
| 6,037,690 | A | * | 3/2000 | Hill ............................. 310/168 |
| 6,051,905 | A | * | 4/2000 | Clark .......................... 310/178 |
| 6,822,361 | B1 | | 11/2004 | Roschlin et al. |
| 7,275,844 | B2 | * | 10/2007 | Watanabe .................... 362/473 |

* cited by examiner

*Primary Examiner*—Chandrika Prasad
(74) *Attorney, Agent, or Firm*—Workman Nydegger

(57) ABSTRACT

An AC unipolar generator provides high power at high frequencies without requiring a source of high-frequency mechanical power. A rotor having a plurality of spaced magnetic disks and two sets of rotating capacitor plates is coupled to a source of mechanical power, the two sets of rotating capacitor plates being spaced apart along the outside of the rotor and electrically connected via a conducting channel. A stator surrounding a portion of the rotor that includes the magnetic disks and one of the two sets of rotating capacitor plates includes a magnetic stator core that forms a magnetic circuit with the magnetic disks of the rotor, a stator field coil, and a fixed set of capacitor plates that capacitively couple the stator field coil to the rotor conducting channel through one of the sets of rotating capacitor plates. A second fixed set of capacitor plates located outside of the stator capacitively couples the rotor conducting channel back to the stator field coil through the other set of rotating capacitor plates. The stator field coil and the two sets of capacitor plates form a resonant LC circuit that characterizes the AC frequency of the power generated by the generator.

27 Claims, 2 Drawing Sheets

RESONANT UNIPOLAR GENERATOR

CROSS-REFERENCE TO RELATED APPLICATION

This application claims priority to U.S. Provisional Application Ser. No. 60/671,890 filed as Apr. 14, 2005, entitled "Resonant Unipolar Generator," the entirety of which is hereby incorporated by reference.

BACKGROUND

1. Technical Field

The technology described in this patent application is generally directed to the field of unipolar generators. More specifically, a resonant unipolar generator is described that is capable of supplying megawatt AC power for a variety of applications heretofore unrealized due to the absence of a suitable power source.

2. Description of the Related Art

Conventional AC electric generators operate at a frequency determined by the number of poles and the shaft rotational speed. The frequency of electric power generated by such generators is limited by mechanical constraints to a few kHz at most. Higher frequency operation can be produced by electronic solid-state or vacuum tube switching devices, or alternatively with a resonant cavity. Such electronic methods, while capable of high frequency, however, are restricted to relatively low power levels in the kilowatt range. Production of electricity at both high frequency (mHz) and high power (megawatts) is heretofore unrealized using conventional power generation technology.

Conversion of electric power to mechanical shaft power was first demonstrated by Michael Faraday in the early 1800s in the form of a unipolar (or homopolar) motor. It is the only electrical/mechanical conversion device that is fundamentally DC in nature. All other so-called DC machines are in fact AC machines requiring commutation or rectification of some sort to change the inherent AC to DC. DC power from a unipolar machine is not easily transformed to high voltage/low current for long distance transmission, and the single-turn unipolar format cannot directly generate the standard current and voltage characteristic required for economic power distribution. Consequently, the unipolar motor/generator developed by Faraday has remained largely a laboratory curiosity except in highly specialized applications, such as electrolytic metals refining where low voltage and high DC current are required.

The multi-turn AC motor/generator has enjoyed commercial success from its introduction due to its desirable AC input/output and favorable voltage/current characteristics. Shaft frequency (i.e., rotational speed) of this and all AC machines is essentially synchronous with electrical frequency. The electrical frequency is typically a multiple of shaft frequency where the multiple is determined by the number of pole pairs physically existing in the machine. Obtaining higher frequency for a given shaft speed in this type of AC machine involves increasing the number of poles. A practical limit in both rotational speed and the number of poles thus determines the maximum electrical frequency obtainable from such an AC machine.

By contrast, there is no relationship between electrical frequency and shaft speed in a unipolar machine simply because, being intrinsically DC in nature, there is no frequency to begin with. However, it is possible to impart AC properties in the unipolar format while still retaining the unique independence of shaft and electrical frequencies. In short, the unipolar principle permits electrical frequencies transcending the mechanical limitations found in standard AC machines.

As with all rotating electrical apparatus, shaft torque is a function of the algebraic product of current and magnetic field. If both current and field reverse simultaneously, than the shaft torque remains unidirectional. This same principle is found in the common series-wound, mechanically-commutated "universal" motor found in small appliances, such as vacuum cleaners, blenders, etc., which explains why this type of motor is able to run at speeds unrestricted by the number of poles as explained above. Because shaft speed is not synchronous with the input frequency, efficiency of the universal motor is poor, relegating it to fractional horsepower applications.

The unipolar format, by comparison, has no criteria for shaft/electrical synchronicity, which renders it suitable for high horsepower applications. Similar to the universal motor, the unipolar rotor circuit is connected in series with the stator field coil (exciter), assuring shaft torque produced by interaction of rotor current and stator field is continuous in one direction only. The standard unipolar motor/generator, however, suffers from a high current/low voltage characteristic. Typically, thousands of amps must be conducted onto the perimeter of the rotor where the surface velocity is maximum using mechanical slip-rings and brushes. Surface wear resulting from mechanical friction and localized arcing accompanied by contact voltage drop are problems that have never been satisfactorily solved. To raise the voltage to more practical levels, the rotor speed must be as high as possible, which compounds the sip-ring conduction problem. Another problem with this configuration is the high current/low voltage DC input/output, which is not amenable to transformer modification because transformers are strictly AC devices.

SUMMARY

An AC unipolar generator provides high power at high frequencies without requiring a source of high-frequency mechanical power. A rotor having a plurality of spaced magnetic disks and two sets of rotating capacitor plates is coupled to a source of mechanical power, the two sets of rotating capacitor plates being spaced apart along the outside of the rotor and electrically connected via a conducting channel. A stator surrounding a portion of the rotor that includes the magnetic disks and one of the two sets of rotating capacitor plates includes a magnetic stator core that forms a magnetic circuit with the magnetic disks of the rotor, a stator field coil, and a fixed set of capacitor plates that capacitively couple the stator field coil to the rotor conducting channel through one of the sets of rotating capacitor plates. A second fixed set of capacitor plates located outside of the stator capacitively couples the rotor conducting channel back to the stator field coil through the other set of rotating capacitor plates. The stator field coil and the two sets of capacitor plates form a resonant LC circuit that characterizes the AC frequency of the power generated by the generator.

DETAILED DESCRIPTION

Figure 1:
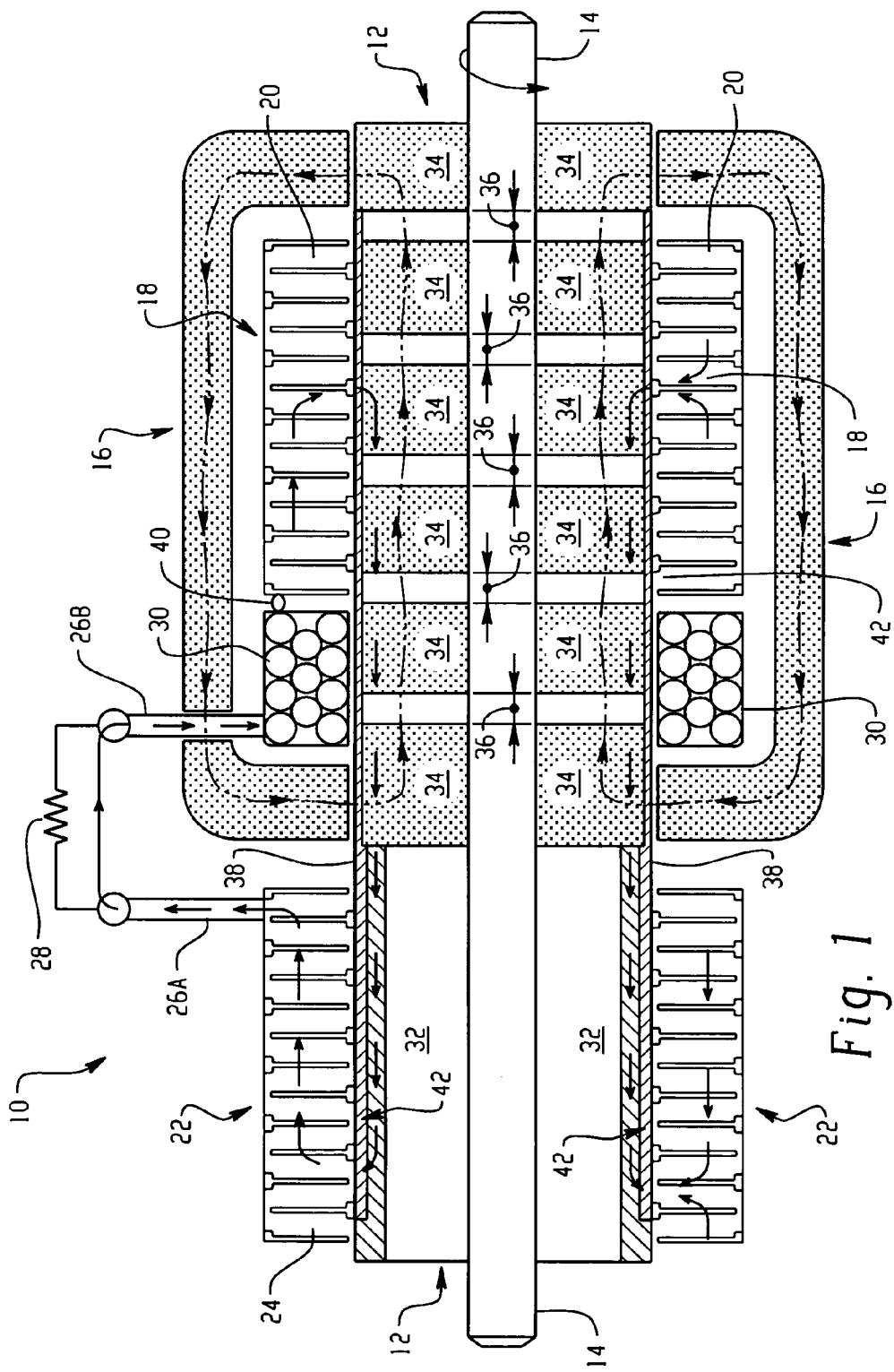
FIG. 1 is a cross-sectional view of an example resonant unipolar generator.

Turning now to the drawing figures, FIG. 1 is a cross-sectional view of an example resonant unipolar generator 10. The exemplary device shown in FIG. 1 includes a rotor core 12, a mechanical shaft 14, a stator core 16 enclosing a stator field coil 30, a first set of capacitor plates 18, 20, and a second set of capacitor plates 22, 24. Also shown in FIG. 1 is a pair of power terminals 26A, 26B for connecting the generator 10 to an external load 28.

The rotor core 12 surrounds the mechanical shaft 14, which in turn is coupled to a source of mechanical power for rotating the rotor core within the stator 16. In the example generator shown in FIG. 1, the rotor core is cylindrical, although as described below, in other example generators the rotor 12 may take a different shape. The rotor 12 includes an insulating central portion 32, which is primarily located outside of the stator core 16, and a series of ferrite disks 34 that are positioned generally within the stator core 16. These ferrite disks 34 are separated by a series of gaps 36, which are also made of an insulating material. Traversing the outer portion of the rotor core 12 is a conducting channel 42, which is utilized to conduct electrical current between the first set of capacitor plates 18, 20 and the second set of capacitor plates 22, 24. Also fixed to the rotor core 12 is a rotating capacitor plate 20 forming a part of the first set of capacitor plates, and comprising a plurality of metallic disks mounted to the outer portion of the rotor 12 in a spaced manner. These spaced metallic disks 20 are electrically-coupled to the conducting channel 42 of the rotor 12.

The stator core 16 is also made of a ferrite material, but unlike the rotor part of the machine, which is rotated via the mechanical shaft 14, the stator is stationary. In the example shown in FIG. 1, the stator includes the stator field coil 30, also referred to as the winding or the exciter, and a fixed capacitor plate 18 comprising a plurality of electrically-coupled circular rings. One of the pair of power terminals 26B protrudes through the ferrite material of the stator core 16 and electrically-couples to the stator field coil 30. In turn, the stator field coil 30 is electrically-coupled to the fixed capacitor plate 18 of the first set of capacitor plates 18, 20 via conductor 40. As described in more detail below, the fixed capacitor plate 18 within the stator core 16 is capacitively-coupled to the rotating capacitor plate 20 in order to transfer electrical current from the stator to the rotor without any mechanical coupling between the two main parts of the generator. The area enclosed by the stator core 16 may be filled with a gas, such as sulfur-hexaflouride ($SF_6$), for example, in order to provide an appropriate level of capacitance for the first set of capacitor plates 18, 20. A small gap 38 separates the rotating part of the machine 12 from the stationary part of the machine 16 so that the rotor 12 can freely rotate within the stator core 16.

The second set of capacitor plates 22, 24 are located generally outside of the stator core 16, and are constructed in a similar manner to the first set of capacitor plates 18, 20. A stationary capacitor 22 is electrically-coupled to one of the pair of power terminals 26A and is capacitively-coupled to a rotating capacitor 24, which is fixed to the part of the rotor 12 that is outside of the stator core 16. The rotating capacitor 24, like the rotating capacitor 20 within the stator core 16, includes a plurality of spaced disks that are attached to the rotor core, and which are electrically-coupled to the conducting channel 42 of the rotor 12.

The exemplary resonant unipolar machine 10 shown in FIG. 1 includes a magnetic circuit and an electrical circuit. The magnetic circuit includes the stator core 16 and the rotor ferrite disks 34. The wavy lines shown in FIG. 1 represent the magnetic field present in this magnetic circuit. The gaps 36 in the rotor between the ferrite disks 34 provide a volume that is used to store magnetic energy. Although these gaps 36 are placed in the rotor part of the magnetic circuit, alternatively, or additionally, similar gaps could be placed in the stator part of the magnetic circuit as well.

Mechanical rotation of the rotor 12 within the stator core 16 generates a voltage at the rotor-stator interface and induces a current flow within the stator field coil 30. This induced current is conducted from the stator field coil 30 through the conductor 40 and into the stationary capacitor 18. Through the capacitive-coupling of the stationary capacitor 18 and the rotating capacitor 20, current flows from the stator 16 into the rotor 12 and is then conducted along the rotor conduction channel 42 and passes outside of the stator core 16 and into the rotating capacitor 24 of the second set of capacitor plates 22/24. The electrical circuit is completed as the current is capacitively coupled from the rotating capacitor 24 into the stationary capacitor 22 of the second set of capacitor plates, and then through the generator load 28 and back into the stator 16 through power terminal 26B.

The generated voltage at the rotor/stator interface is an alternating sinusoidal waveform with a frequency dictated by the inductance and capacitive values of the stator field coil 30 and the combination of the first and second set of capacitor plates 18/20 and 22/24, respectively. Because the electrical circuit is essentially an L-C tank circuit, it will naturally resonate at a frequency described by the inductance and capacitance of the coil 30 and the capacitor plates 18/20 and 22/24. Unlike other types of AC machines, the electrical frequency at which the resonant unipolar generator 10 operates is not dependant upon the mechanical frequency of rotation. Thus, high-frequency and high power generation is possible without having to provide a source of high-frequency mechanical rotation.

Figure 2:
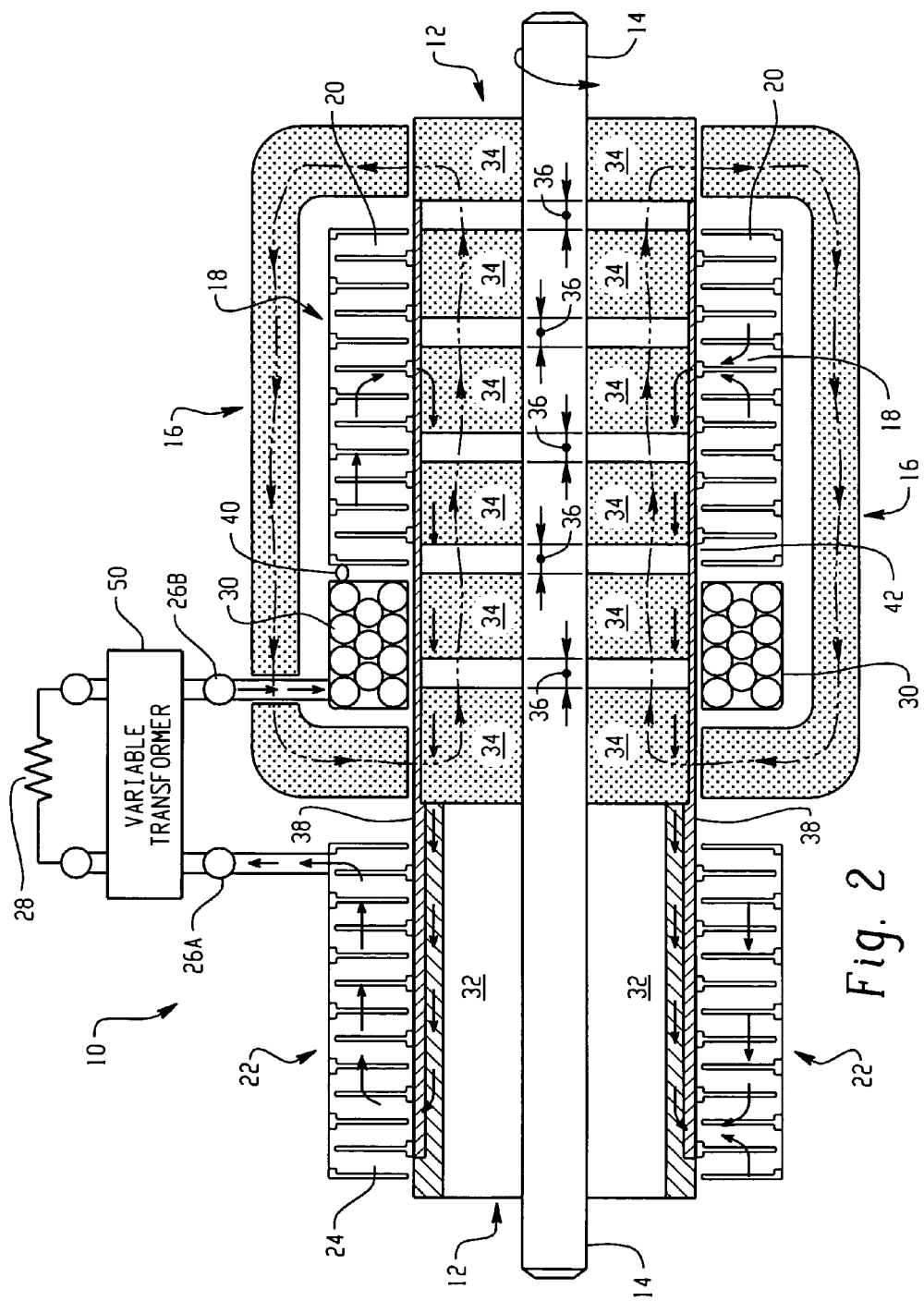
FIG. 2 is another cross-sectional view of an example resonant unipolar generator.

Unlike the DC unipolar machine described above, the unipolar format in AC mode of the resonant unipolar generator 10 allows the mechanical slip rings to be replaced with the interleaving capacitor disc plates 18/20 and 22/24. In this manner, the stator 16 and rotor 12 are capacitively-coupled without physical contact and corresponding electrical loss. Furthermore, AC operation allows for the transformation of innate high current/low voltage to whatever current/voltage may be required for the load 28, such as through a variable transformer 50, as depicted in FIG. 2.

The first and second set of capacitor plates 18/20 and 22/24 should have reasonable dimensions and running clearances, which are characteristics that are in some ways inconsistent with the high current feature of the unipolar machine 10. Accommodation of these conflicting demands on the design of the capacitors 18/20 and 22/24 may be accomplished by operating the generator 10 at frequencies above 50 kHz, for example, because current flow through a capacitor of given size and plate voltage is a function of frequency. Thus, in the AC unipolar format, mechanical considerations of the capacitor design characterize the generator's operation via a minimum operating frequency as opposed to a maximum frequency, which is typical of conventional AC machines. Although the AC unipolar machine 10 may run as either a motor or a generator, the fact that sources of power above 50 kHz, for example, are not commonly available at the time of this application indicates that the generator mode will be of most interest in the near future.

Further details of the electrical and magnetic characteristics of the resonant unipolar generator 10 are now provided.

The unipolar field excitation coil 30 connected in series with the coupling capacitors 18/20 and 22/24 together comprise an LC (inductor-capacitor) circuit where peak current occurs at the resonant frequency of the circuit. Because high current in any unipolar machine is its chief feature, it is preferable to operate the unipolar LC machine circuit at resonance. Hence, the descriptive title of this application as a "resonant" unipolar generator.

Voltage in the LC machine circuit is developed at the rotor/stator interface 12/16 where rotor conductors 42 traverse the magnetic field formed within the ferrite materials of the stator 16 and rotor 12. This voltage is the generated voltage that drives current through the machine, both offsetting internal resistive losses and supplying terminal power to an external load 28. The generated voltage is proportional to the product of rotor speed and stator magnetic field, which in turn is proportional to the machine current. The magnetic field, oscillating in polarity at resonance, will produce a sinusoidal generated voltage exactly in phase with the current because the current is the source of the magnetic field. This closed loop aspect of the machine 10 assures that the generated voltage will be exactly in phase and proportional to current.

Due to this closed-loop relationship of current, generated voltage and magnetic field, there is a minimum rotor critical rotational speed below which the generator may not operate properly. At a certain rotational speed, the generated voltage at the rotor/stator interface will match the total internal and load resistive voltage drops in the machine 10. As the rotational speed of the rotor 12 reaches this minimum speed, a resulting current will begin to flow in the electrical circuit of the machine 10, thereby increasing the magnetic flux energy in the stator/rotor magnetic circuit. The increasing magnetic field in turn raises the generated voltage at the rotor/stator interface, thus resulting in increased current flow which leads to a higher resistive drop opposing the generated voltage. In brief, both the generated voltage and the opposing resistive drop are functions of current so that current drops out of the equation, meaning that any value of current will satisfy the equation.

Thus, at the critical speed, a runaway condition exists where current suddenly builds up from zero to a value limited only by saturation of the magnetic core 16/34. Because core permeability falls off slightly with increasing current below saturation, it is possible to control current in the machine 10 by fine adjustments of the shaft 14 speed. Except for the small speed variation allowed by variable permeability, however, shaft speed should not rise appreciably above the critical speed when operating within saturation limits. Thus, the shaft 14 speed is effectively "locked-in" to the critical speed, similar to synchronous speed being locked-in to frequency in a conventional AC machine. Critical speed in the machine 10 is determined by the total circuit resistance (internal plus load), rather than by electrical frequency because the unipolar frequency is determined simply by the LC resonant properties of the excitation coil 30 and the coupling capacitors 18/20 and 22/24, independent of shaft speed.

The two sets of capacitor plates 18/20 and 22/24 are utilized in the resonant unipolar generator 10 to transfer current into and out of the rotor 12. The two capacitor sets 18/20 and 22/24 are preferably identical to one another, although in other embodiments they may have different mechanical dimensions and shapes. Each set 18/20 and 22/24 include interleaving rotor and stator plates of generally similar size. The rotor-mounted plates 20, 24 are preferably circular discs surrounding the circumference of the rotor 12, as shown in FIG. 1, although in other configurations the rotor plates may take a different form. The stator plates 18, 22 are essentially thin rings with their outside circumference mounted to a common housing. Current flow axially along the rotor surface 42 between sets of rotor plates is represented as straight dashed arrows in FIG. 1. The electrical circuit is completed as current flows between stator plate sets 18, 22 via the machine's excitation coil (inductor) 30 and the external load 28.

Magnetic flux lines within the magnetic circuit 16, 34, 36 are represented as solid wavy arrows, as shown in FIG. 1. The magnetic flux is confined to the ferrite core comprising the bulk of the machine 10. As noted previously, the rotor 12 may be divided into a series of gaps 36 formed by ferrite discs 34, rather than a solid rotor core as would be typical of a DC version of the unipolar machine. FIG. 1 shows magnetic flux lines and electrical current crossing one another at just one point at approximately the middle of the machine 10. It is in this region of flux/current interface that torque is produced and accounts for the preferred configuration of the coupling capacitor plates in which one set of capacitors 18/20 is located within the ferrite core shell and the second set of capacitor plates 22/24 is located outside of the stator core 16. If both of the capacitor sets 18/20 and 22/24 where placed outside the stator core 16, while more convenient from a mechanical standpoint, there would then be two regions of flux/current interaction, each producing torque in opposite directions and thus resulting in zero net machine torque. In the case of a generator, such an arrangement would equate to no electrical power production.

Maximum machine power occurs when the rotor 12 current is maximum. Thus, in designing a machine as shown in FIG. 1, the design should be oriented toward maximizing current throughout the electrical circuit. Initially, this would suggest a design having a large number of closely spaced capacitor plates, as well as minimal air gaps in the core magnetic circuit, with just a few winding turns of the exciter coil 30 to prevent core saturation. The following analysis, however, demonstrates that this initial design hypothesis is not optimal.

Recall from the description above that the resonant unipolar machine 10 should be considered as an LC tank circuit. It is a resonator with integral excitation (generated voltage) for sustaining oscillation against resistive losses, both internal and load. Analogous to a mechanical pendulum, energy in the machine 10 is alternately stored magnetically as flux filling the core gaps 36 of the magnetic circuit and electrically as an electric field filling capacitor volume between the first and second set of capacitor plates 18/20, 22/24. Energy extracted during the peak of the current swing, which is extracted by electrical losses and the load 28, is made up simultaneously by the in-phase generated voltage at the rotor/stator interface. Therefore, the greater the stored magnetic and electric energy in the machine 10, the more energy is available for extraction and simultaneous replacement.

Theory indicates that the energy stored in a resonant circuit is proportional to the absolute size of gap volumes of the inductor and capacitor. The ratio of these volumes is proportional to the ratio of E (electric field intensity) and B (magnetic flux density) fields squared, respectively. For optimum space and materials utilization the E and B fields should be near their respective breakdown and saturation values. This is the case irrespective of the number of inductor (excitation coil 30) turns N, which cancels out in the calculations. In short, the ratio E/B squared determines the ratio of magnetic core gap volume to capacitor gap volume. However, the shape of the core and capacitor gap volumes, not simply their absolute volumes, is a function of the product of inductor 30 turns N and resonant frequency f, i.e., a function of Nf. For example, the axial dimensions of the core and capacitor gaps are directly proportional to Nf making the machine more cylindrical in shape as Nf increases. Because N cannot be less than unity, and for practical reasons should be at least several turns, the frequency f becomes the final determinant of machine shape, but not overall size. The term "axial" as used here means the direction parallel to the electric and magnetic field lines, although when the machine is configured in the example of FIG. 1, "axial" may also refer to the actual physical axial dimension and will hereafter be used in that context.

As frequency f approaches zero the axial gap dimensions also approach zero, which means the gap volumes approach zero, a condition that is operationally permissible in the DC case, as indicated above. At high frequency, the large total axial gap dimension is dictated by theory for the storage of magnetic energy. The example design shown in FIG. 1 incorporates the rotor core 12 for this purpose, although the stator 16 could also be used to provide the gaps in the magnetic circuit. Multiple ferrite rotor discs 34 in tandem help minimize flux fringing and act to confine the flux mostly within the nominal rotor boundaries. While multiple rotor discs 34 in series simply facilitate flux confinement, the multiple capacitor plates, connected in parallel within each set 18/20 and 22/24, are provided to obtain the required capacitance.

Regarding alternative machine 10 shapes and sizes, it should be understood that machine shape changes as overall size changes for a given frequency. In other words, the machine cannot simply be scaled up or down at constant shape for a given frequency. This is because, at constant frequency, the axial dimensions are not proportional to the radial dimensions but rather to the square of radial dimensions, i.e., to the circular surface area. Thus, at a given frequency, a small machine is more disc-shaped and a larger machine more cylindrical-shaped. Where the frequency is the variable and machine diameter is fixed, axial dimensions increase directly with frequency as indicated above. This means a low frequency machine is more disc-shaped and a high frequency machine is more cylindrical-shaped. Regardless of the change of shape with size and frequency, there is no overall size limitation imposed by frequency. A large machine may operate at high frequency just as well as a small machine, only the shape will be different.

Theory of Operation

An electromagnetic resonant circuit is comprised of two energy storage components: 1) an inductor which stores magnetic field energy; and 2) a capacitor which stores electric field energy. Under conditions of resonance, there exists equal exchange of energy between the inductor and the capacitor where each alternately charges and discharges the same quantity of energy. In both an inductor and capacitor, energy is stored in the core gap or plate gap respectively. The equation of energy balance at resonance is given simply as:

$$E_L = E_C \qquad \text{Eq.1}$$

Where: $E_L$=inductor stored energy; and
$E_C$=capacitor stored energy.

Using the subscript "g" to denote inductor gap properties, inductor energy becomes:

$$E_L = \frac{1}{2\mu_o} v_g B_g^2 = \frac{1}{2\mu_o}(l_g A_g) B_g^2 \qquad \text{Eq.2}$$

Where:
$\mu_o$=magnetic permeability of space;
$v_g = l_g A_g$=inductor gap volume; and
$B_g$=magnetic flux density in the gap.

Capacitor energy is similarly stated using subscript "p" to indicate plate properties:

$$E_C = \frac{\varepsilon_o}{2} v_p E_p^2 = \frac{\varepsilon_o}{2}(l_p A_p) E_p^2 \qquad \text{Eq.3}$$

Where:
$\varepsilon_o$=dielectric constant of material (insulating gas) between capacitor plates;
$v_p = l_p A_p$=volume enclosed within the plate gap; and
$E_p$=electric field strength within the plate gap.

Substituting Eqs.2, 3 into Eq.1:

$$\frac{v_p}{v_g} = \frac{l_p A_p}{l_g A_g} = \frac{1}{\varepsilon_o \mu_o}\left(\frac{B_g}{E_p}\right)^2 = c^2\left(\frac{B_g}{E_p}\right)^2 \qquad \text{Eq.4}$$

Where:

$$c = \frac{1}{\sqrt{\varepsilon_o \mu_o}} = \text{speed of light}$$

speed of light.

The other fundamental equation defining resonance is equivalence of voltage across the inductor and capacitor such that:

$$V_L = V_C \qquad \text{Eq.5}$$

Where: $V_L$=voltage across the inductor; and
$V_C$=voltage across the capacitor.

$$V_L = I\omega_R L \qquad \text{Eq.6}$$

$$V_C = \frac{I}{\omega_R C} \qquad \text{Eq.7}$$

Where: $\omega_R$ resonant angular frequency=$2\pi f_R$; and
I=current flowing through series-connected inductor and capacitor.

Substituting Eqs.6, 7 into Eq.5 and solving for resonant frequency $\omega_R$:

$$\omega_R = \frac{1}{\sqrt{LC}} \qquad \text{Eq.8}$$

Integration of the capacitor comprising the LC resonant circuit into the machine structure of an AC unipolar machine provides a non-contact method for conducting current between rotor and stator. Capacitive coupling of rotor and stator electrical circuits is effective primarily at relatively high frequencies, typically above 30 kHz, as required for practical-sized capacitor plate surface area while also allowing sufficient running clearance between stationary and rotating inter-leaving capacitor plates. The resulting inter-plate volume dictates the magnitude of electric field capacitive energy storage.

Similarly, the machine magnetic structure serves as the inductive element of the resonant LC circuit with an attendant core gap for storing magnetic energy. The relationship between capacitor gap volume and inductor gap volume, according to Eq.4, constitutes the primary criterion for machine design. Exact proportions of gap dimensions determine L and C values for both energy storage (Eqs.2, 3) and resonant frequency (Eq.8). Gap length relative to gap area, for both inductor and capacitor gaps, are evaluated by first expressing the physical parameters of inductance L and capacitance C:

$$\frac{n_x^2}{\Re} = n_x^2 \mu_o \frac{A_g}{l_g} \qquad \text{Eq.9}$$

Where: $n_x$=number of turns comprising the inductor coil; and
$\Re$=magnetic circuit reluctance.

Similarly for the capacitor:

$$C = \varepsilon_o \frac{A_p}{l_p} \qquad \text{Eq.10}$$

Combining Eqs.9, 10 into Eq.8:

$$\frac{1}{\omega_R^2} = \left(n_x^2 \mu_o \frac{A_g}{l_g}\right)\left(\varepsilon_o \frac{A_g}{l_g}\right) = n_x^2 \mu_o \varepsilon_o \frac{A_g A_p}{l_g l_p} = \frac{n_x^2}{c^2}\frac{A_g A_p}{l_g l_p} \qquad \text{Eq.11}$$

The ratios of gap area with respect to gap length for both the inductor gap and capacitor gaps are specified by Eq.11 in terms of resonant frequency $\omega_R$. Conversely, the products of gap area and gap length are specified by Eq.4 in terms of magnetic and electric field intensities. Inductor gap area $A_g$ and capacitor plate area $A_p$ are given as initial design conditions based on optimized proportions of inductor coil relative to inductor core physical dimensions. Therefore, three dependent variables remain, inductor turns $n_x$, inductor gap length $l_g$ and capacitor inter-plate length $l_p$. Exact values of the latter two variables are solved by substitution into the two equations comprising Eqs.4, 11.

The third variable, number of inductor turns $n_x$, is solved from an equation used to determine the so-called "critical speed," which is the shaft speed necessary to generate sufficient voltage for offsetting the combined voltage drops across the internal and load resistances. This is the minimum shaft frequency required to sustain resonant current oscillation. Equating these voltages gives:

$$V_G = V_\Omega \qquad \text{Eq.12}$$

Where: $V_G$=internally generated voltage duce to shaft rotation; and
$V_\Omega$=total circuit resistive voltage drop.

Expanding Eq.12 into its constituent parts:

$$\frac{\pi \mu_o}{4} \frac{D_m^2}{l_g} f_{S-crit} n_n \, \mathrm{X} = \mathrm{X} \, R_x\left(1 + \frac{R_L}{R_x}\right) \qquad \text{Eq.13}$$

Where:
$D_m$=inner core diameter;
$f_{S-crit}$=critical shaft frequency; and
$R_x$ and $R_L$ are inductor coil resistance and load resistance respectively.

Machine current I cancels out in Eq.13 clearly indicating the independence of current relative to shaft frequency $f_{S-crit}$. In other words, once the critical speed is reached, oscillation can proceed at any current amplitude while shaft speed remains constant. Only shaft torque increases with rising amplitude to account for increasing power demand. The potential for runaway current is limited by saturation of the core material beyond which flux density is no longer linear with current. In fact, the slight non-linearity of $\mu_o$ below saturation provides a natural self-regulating mechanism for controlling current in response to minor variations of shaft speed.

Because inductor coil resistance $R_x$ is a function of the turns squared, i.e. $n_x^2$, there remains in Eq.13 after canceling a first-power value of $n_x$, completing the derivation of all fundamental parameters necessary for actual machine design.

Generator output power, in units of watts, is expressed by Eq.14 which incorporates the foregoing considerations in an optimized design:

$$P_{output-watts} = (3.67 \times 10^{-6})\frac{k_f}{n_x^2} h_w D_w^4 (rpm)^2 B_g^2 E_{eff}(1 - E_{eff}) \qquad \text{Eq.14}$$

Where:
$k_f$=inductor winding fill-factor;
$h_w$=winding axial length, inches;
$D_w$=winding diameter, inches;
(rpm)=shaft speed;
$E_{eff}$=machine energy efficiency; and
$B_g$=gap flux density, Tesla.

Several interesting features become apparent upon examination of Eq.14. At constant efficiency $E_{eff}$, machine power is proportional to the fifth-power of overall dimensions $h_w D_w^4 = S^5$. Thus, for a machine of fixed shape, the change of any dimension S will affect machine power by the fifth-power of that dimension. Fifth-power dimensional power-dependence is a trait common to all electromagnetic devices when efficiency and frequency are held constant with change in machine size. Accordingly, a 14.8% increase in size results in a doubling of power production. Conversely, power drops off quickly with decreasing size such that a half-size machine will produce only 3.12% of the reference output power.

Output power is also sensitive to gap flux density $B_g$, varying as the square. Raising flux density from 0.60 Tesla to 0.85 Tesla, will result in a 2-fold increase in machine power. The same situation applies to shaft speed such that a rise from 10,000 rpm to 14,140 rpm will yield twice the power production.

Machine efficiency $E_{eff}$ also plays a role in machine power according to Eq.14. Power is zero when efficiency is either 0% or 100% but rises to peak power at $E_{eff}$=50%. This is the condition where $R_x=R_\Omega$, a typical example of "impedance matching" in order to obtain maximum power transfer between source and load.

Example Applications

Potential applications of the resonant unipolar generator 10 described herein include: 1) electrification of highways for inductively-coupled transfer of power to vehicles from roadbed cables; 2) transmission of electric power through space without wires to orbiting satellites or from orbiting solar collectors to ground-based receivers; 3) military anti-aircraft and missile defense systems; and 4) industrial high frequency induction heating.

This written description uses examples to disclose the invention, including the best mode, and also to enable a person skilled in the art to make and use the invention. The patentable scope of the invention may include other examples that occur to those skilled in the art.

It is claimed:

1. A machine for generating AC electrical power, comprising:
 a rotor connectable to a source of mechanical power for imparting angular rotation to the rotor, the rotor being at least partially constructed of a magnetic material;
 a stator surrounding at least part of the rotor and comprising a magnetic stator core and a stator field coil; and
 a capacitor for electrically-coupling the stator field coil to the rotor, the combination of the magnetic stator core and the stator field coil connected to the capacitor forming a resonant LC circuit that characterizes the AC frequency of the power generated by the machine.

2. The machine of claim 1, wherein the capacitor comprises a set of capacitor plates, a first portion of the set of capacitor plates being affixed to the rotor and a second portion of the set of capacitor plates being affixed to the stator.

3. The machine of claim 2, wherein the first portion and second portion of the set of capacitor plates are affixed to the rotor and stator, respectively, in an interleaving manner.

4. The machine of claim 2, wherein the first portion of the set of capacitor plates rotate relative to the second portion of the set of capacitor plates via the angular rotation imparted to the rotor.

5. The machine of claim 2, wherein the first portion of the set of capacitor plates comprise a plurality of spaced circular disks.

6. The machine of claim 5, wherein the second portion of the set of capacitor plates comprise a plurality of spaced circular disks of generally the same size and shape as the first portion.

7. The machine of claim 6, wherein the spacings between the circular disks of the first portion of the set of capacitor plates and the rings of the second portion of the set of capacitor plates enable the interleaving of the first and second portions of the set of capacitor plates.

8. The machine of claim 1, wherein the capacitor comprises a first set of capacitor plates and a second set of capacitor plates, the first set of capacitor plates being located within an area bound by the stator, and the second set of capacitor plates being located outside of the are bound by the stator.

9. The machine of claim 8, wherein the first and second sets of capacitor plates comprise interleaved sets of capacitor plates, a rotating set of capacitor plates affixed to the rotor and a stationary set of capacitor plates through which the first rotating set of capacitor plates rotatably traverse.

10. The machine of claim 9, wherein the rotating set of capacitor plates comprise a plurality of spaced circular disks.

11. The machine of claim 9, wherein the stationary set of capacitor plates comprise a plurality of space circular disks.

12. The machine of claim 11, wherein the spacings between the circular disks of the rotating set of capacitor plates and the circular disks of the stationary set of capacitor plates enable the interleaving of the sets of capacitor plates.

13. The machine of claim 9, wherein the rotating sets of capacitor plates are affixed to the rotor at a conducting channel that provides an electrical current flow path between the rotating set of capacitor plates within the stator and the rotating set of capacitor plates outside of the stator.

14. The machine of claim 13, wherein the stationary sets of capacitor plates are electrically-coupled to the stator field coil so that an electrical circuit is formed between the stator field coil and the first and second sets of capacitor plates with the conducting channel of the rotor providing the current flow path to complete the circuit.

15. The machine of claim 1, wherein the rotor comprises a rotor core and a shaft for coupling the rotor to the source of mechanical power.

16. The machine of claim 15, wherein the rotor core is cylindrical.

17. The machine of claim 16, wherein the rotor core comprises a plurality of magnetic disks separated by a plurality of gaps for storing magnetic energy.

18. The machine of claim 17, wherein the rotor magnetic disks and the magnetic stator core comprise a magnetic circuit.

19. The machine of claim 18, wherein the rotor magnetic disks are located within an area bound by the stator.

20. The machine of claim 19, wherein the rotor magnetic disks and the magnetic stator core are made of a ferrite material.

21. The machine of claim 1, wherein the stator is stationary relative to the rotating rotor, and encloses an area within which the rotator is capable of freely rotating.

22. The machine of claim 21, wherein the stator includes a fixed set of capacitive plates and the rotor includes a rotating set of capacitive plates interleaved with the fixed set of capacitive plates of the stator, and wherein the stator area is filled with a gaseous substance that increases electric field breakdown strength and increases the capacitance of the fixed and rotating sets of capacitive plates.

23. The machine of claim 1, further comprising a pair of power terminals for transferring electrical power to a load coupled to the machine.

24. The machine of claim 1, further comprising a variable transformer connected between the power terminals and the load.

25. The machine of claim 1, wherein a voltage is generated at an interface between the rotor and stator as the rotor is rotated by the source of mechanical power, the generated voltage being an alternating sinusoidal waveform with a frequency characterized by the inductance of the magnetic stator core and the stator field coil and the capacitance of the capacitor.

26. The machine of claim 1, wherein the amount of electrical energy stored by the machine is defined by a gap distance between interleaved sets of capacitor plates that form the capacitor and the amount of magnetic energy stored by the machine is defined by gaps between magnetic discs within a magnetic circuit formed by the magnetic stator core and the magnetic part of the rotor.

27. An AC unipolar generator, comprising:
 a rotor connectable to a source of mechanical power for imparting angular rotation to the rotor and including a plurality of magnetic disks separated by a plurality of gaps and two sets of rotating capacitor plates, the two sets of rotating capacitor plates being spaced apart along the outside of the rotor and electrically connected via a conducting channel; and a stator surrounding a portion of the rotor that includes the magnetic disks and one of the two sets of rotating capacitor plates, the stator comprising a magnetic stator core that forms a magnetic circuit with the magnetic disks of the rotor, a stator field coil, and a first fixed set of capacitor plates that capacitively couple the stator field coil to the rotor conducting channel through the one of the two sets of rotating capacitor plates; and a second fixed set of capacitor plates located outside of the stator which capacitively couples the rotor conducting channel back to the stator field coil through a second of the two sets of rotating capacitor plates, the second of the two sets of rotating capacitor plates being located outside of the stator;

wherein the magnetic stator core and the stator field coil in cooperation with the two sets of capacitor plates form a resonant LC circuit that characterizes the AC frequency of the power generated by the generator.

* * * * *

UNITED STATES PATENT AND TRADEMARK OFFICE
CERTIFICATE OF CORRECTION

| | | |
|---|---|---|
| PATENT NO. | : 7,459,823 B1 | Page 1 of 1 |
| APPLICATION NO. | : 11/404068 | |
| DATED | : December 2, 2008 | |
| INVENTOR(S) | : Jack H. Kerlin | |

It is certified that error appears in the above-identified patent and that said Letters Patent is hereby corrected as shown below:

<u>Column 1</u>
Line 7, remove "as"

<u>Column 5</u>
Line 62, change "include" to --includes--

<u>Column 11</u>
Claim 8, line 58, change "are" to --area--

Signed and Sealed this

Second Day of March, 2010

David J. Kappos
*Director of the United States Patent and Trademark Office*